US006876744B1

(12) United States Patent
Etzel et al.

(10) Patent No.: US 6,876,744 B1
(45) Date of Patent: Apr. 5, 2005

(54) METHODS AND APPARATUS FOR ENHANCED CMEA INCLUDING A CMEA ITERATION PRECEDED AND FOLLOWED BY TRANSFORMATIONS AND EMPLOYING AN INVOLUNTARY LOOKUP

(75) Inventors: Mark H. Etzel, Harvard, MA (US); Robert John Frank, Silver Spring, MD (US); Daniel Nelson Heer, Newton, NH (US); Robert Joseph McNelis, Columbia, MD (US); Semyon B. Mizikovsky, Morganville, NJ (US); Robert John Rance, Andover, MA (US); R. Dale Shipp, Columbia, MD (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/120,763

(22) Filed: Jul. 22, 1998

Related U.S. Application Data (60) Provisional application No. 60/054,018, filed on Jul. 29, 1997, and provisional application No. 60/053,412, filed on Jul. 22, 1997.

(51) Int. Cl.[7] .................................................. H04L 9/32
(52) U.S. Cl. .......................... 380/28; 380/247; 380/281
(58) Field of Search .......................... 380/28, 277, 255, 380/247, 270, 274, 281, 284; 455/410, 411

(56) References Cited

U.S. PATENT DOCUMENTS

| | | | | |
|---|---|---|---|---|
| 1,516,180 A | * | 11/1924 | Friedman | 380/28 |
| 1,522,775 A | * | 1/1925 | Friedman | 380/28 |
| 5,159,634 A | * | 10/1992 | Reeds | 380/42 |
| 5,371,796 A | * | 12/1994 | Avarne | 380/23 |
| 5,594,797 A | * | 1/1997 | Alanara et al. | 380/28 |

OTHER PUBLICATIONS

Feistel, Cryptography and Computer Privacy, Scientific American May 1973, p. 15–23.*

G. S. Vernam, Cipher Printing Telegraph System, AIEE, Feb. 1926.*

Appendix A, IS–54 CTIA, Feb. 1992.*

Bruce Schneier, Applied Cryptography, 2e, Oct. 1995.*

* cited by examiner

*Primary Examiner*—Kim Vu
*Assistant Examiner*—James Seal (57) ABSTRACT

Methods and apparatus for enhanced CMEA, or ECMEA, processing. A forward ECMEA and a reverse ECMEA process are provided. The forward ECMEA process decrypts text encrypted by the reverse ECMEA process and the reverse ECMEA process decrypts text encrypted by the forward ECMEA process. The forward ECMEA process employs a first transformation, an iteration of the CMEA process, and a second transformation. The reverse ECMEA process employs a first inverse transformation, an iteration of the CMEA process, and a second inverse transformation. The transformations and inverse transformations, and the iterations of the CMEA process, employ secret offsets to improve security. The transformations and the iteration of the CMEA process also employ an enhanced tbox function using an involuntary lookup table.

18 Claims, 8 Drawing Sheets

METHODS AND APPARATUS FOR ENHANCED CMEA INCLUDING A CMEA ITERATION PRECEDED AND FOLLOWED BY TRANSFORMATIONS AND EMPLOYING AN INVOLUNTARY LOOKUP

This application claims the benefit of U.S. Provisional Application Ser. No. 60/053,412, filed Jul. 22, 1997, and U.S. Provisional Application Ser. No. 60/054,018, filed Jul. 29, 1997.

FIELD OF THE INVENTION

The present invention relates generally to wireless telephone cryptography. More particularly, the invention relates to an improved security cryptosystem for rapid and secure encryption in a wireless telephone system without requiring large amounts of additional system resources.

BACKGROUND OF THE INVENTION

Wireless telephony uses messaging for several purposes including, for example, conveying status information, reconfiguring operating modes, handling call termination, and conveying system and user data such as a subscriber's electronic serial number and telephone number, as well as conversations and other data transmitted by the user. Unlike ordinary wire telephony, in which a central serving station is connected to each subscriber by wire, thus ensuring a fair degree of protection from eavesdropping and tampering by an unauthorized party (attacker), wireless telephone serving stations (i.e., base stations) must transmit and receive messages via signals over the air, regardless of the physical location of the subscribers.

Because the base station must be able to send and receive messages to and from a subscriber anywhere, the messaging process is wholly dependent on signals received from and sent to the subscriber equipment. Because the signals are transmitted over the air, they can be intercepted by an eavesdropper or interloper with the right equipment.

If a signal is transmitted by a wireless telephone in plaintext, a danger exists that an eavesdropper will intercept the signal and use it to impersonate a subscriber, or to intercept private data transmitted by the user. Such private data may include the content of conversations. Private data may also include non-voice data transmitted by the user such as, for example, computer data transmitted over a modem connected to the wireless telephone, and may also include bank account or other private user information transmitted typically by means of keypresses. An eavesdropper listening to a conversation or intercepting non-voice data may obtain private information from the user. The message content of an unencrypted telephone signal (i.e., plaintext signal) is relatively easily intercepted by a suitably adapted receiver.

Alternatively, an interloper can interject himself into an established connection by using a greater transmitting power, sending signals to the base station, and impersonating a party to the conversation.

In the absence of applying cryptography to messages being transmitted by wireless signals, unauthorized use of telephone resources, eavesdropping of messages, and impersonation of called or calling parties during a conversation are possible. Such unauthorized interloping and/or eavesdropping has in fact proven to be a grave problem and is highly undesirable.

The application of cryptography to wireless telephone applications offers a solution to the security problems discussed above, but the application of standard cryptography methods to wireless telephony has encountered significant difficulties due to the computationally-intensive nature of these methods. Specifically, these methods are subject to the constraints imposed by the desire to furnish a small wireless handset and the constraints on processing power imposed by the small size of the handset. The processing power present in typical wireless handsets is insufficient to handle the processing requirements of commonly known cryptographic algorithms such as DES (Data Encryption Standard). Implementing such a commonly known cryptographic algorithm in a typical wireless telephone system would potentially increase the time needed to process signals (i.e., encrypt and decrypt), thereby causing unacceptable delays for subscribers.

One cryptographic system for wireless telephony is disclosed in Reeds U.S. Pat. No. 5,159,634 ("Reeds"), incorporated herein by reference. Reeds describes a cryptographic process known as the CMEA ("Cellular Message Encryption Algorithm") process. Central to the operation of the CMEA is the tbox function, which is a one to one mapping of one octet to another, using a known table and a secret key. Beginning with an initial index, key material is combined with table material in multiple iterations to perform the mapping. The tbox function can be implemented either as a function call or as a static memory-resident tbox table. The tbox table's purpose, when implemented as in the latter case, is to allow significant speed-up of encryption for a given security level.

Enhancements to the CMEA function exist, disclosed in our patent application Ser. No. 09/059,107, now issued patent U.S. Pat. No. 6,266,411, entitled "Methods and Apparatus for Multiple-Iteration filed on Apr. 13, 1998, and our patent application Ser. No. PCT/US98/07404, entitled "Methods and Apparatus For Enhanced Security Expansion of a Secret Key Into a Lookup Table" filed on Apr. 13, 1998. These enhancements provide significantly increased security to the CMEA process. However, additional enhancements would provide further increased security.

The CMEA algorithm of the prior art may be significantly improved as described in greater detail below. These improvements provide an additional degree of security which is highly advantageous.

SUMMARY OF THE INVENTION

The present invention provides an additional degree of security to cryptographic algorithms such as CMEA by providing a forward enhanced CMEA, or ECMEA, process, as well as a reverse ECMEA process. Information encrypted by the forward process is decrypted by the reverse process, and information encrypted by the reverse process is decrypted by the forward process. The forward ECMEA process subjects the message to a first transformation before an iteration of the CMEA algorithm, and a second transformation after the iteration of the CMEA algorithm The iteration of the CMEA algorithm includes permutation of the inputs to the tbox function by a first secret offset. The tbox function employed by the CMEA algorithm is enhanced through the use of an involutary lookup table. The transformations employ the first secret offset and a second secret offset. The second transformation is identical to the first transformation, except that the second transformation employs the first and second offsets in opposite order from that in which they are employed by the first transformation. Each transformation performs bit trading between each pair of adjacent octets, an involutary lookup with feedback for each octet, and a random byte permutation.

The transformations are not self-inverting, and so the forward ECMEA process as a whole is not self-inverting. In order to decrypt text encrypted by the forward ECMEA process, or to encrypt text for decryption by the forward ECMEA process, the reverse ECMEA process is used. The reverse ECMEA process employs a first inverse transformation, followed by an iteration of the CMEA process, followed by a second inverse transformation. The first inverse transformation performs an inverse random byte permutation, an inverse involutary lookup with feedback for each octet, and inverse bit trading between each pair of adjacent octets. The first inverse transformation also employs the first and second secret offsets in a different order from that in which they are employed by the first transformation, as is shown in detail below. The iteration of the CMEA algorithm includes permutation of the inputs to the tbox function by the first secret offset. The tbox function employed by the CMEA algorithm is enhanced through the use of an involutary lookup table. The second inverse transformation is identical to the first inverse transformation, except that the second inverse transformation employs the first and second secret offsets in opposite order from that in which they are employed by the first inverse transformation.

The forward ECMEA process decrypts text encrypted by the reverse ECMEA process, and the reverse ECMEA process decrypts text encrypted by the forward ECMEA process. The enhancements discussed above improve CMEA, and can be implemented to operate quickly and efficiently in a small computer such as is commonly used in a mobile wireless transceiver.

A cryptographic system according to the present invention may suitably employ an enhanced tbox function, also using first and second offsets to permute inputs to the enhanced tbox function and for use in CMEA and in performing the transformation and inverse transformation. Each offset is created using two secret values and an external cryptosync value. The secret values may be generated by any of a number of techniques commonly known in the art. In some applications, the external cryptosync value used to encrypt a first message of a call is an 8-bit value implemented as a binary counter.

In another aspect of the present invention, a telephone system according to the present invention includes a mobile station and a base station. Each of the mobile station and the base station generates text and supplies it to an I/O interface which identifies it as generated text and supplies the text and the identification to an encryption/decryption processor, which in turn encrypts the text and supplies it to a transceiver for transmission. When the apparatus receives a transmission via the transceiver, the transmission is identified as incoming ciphertext, and the ciphertext and the identification are supplied to the encryption/decryption processor which decrypts the ciphertext and supplies it as text to the I/O processor for routing to its destination. The mobile station preferably employs the forward ECMEA process and the base station preferably employs the reverse ECMEA process.

A more complete understanding of the present invention, as well as further features and advantages of the invention, will be apparent from the following Detailed Description and the accompanying drawings.

Detailed DESCRIPTION

Figure 1:
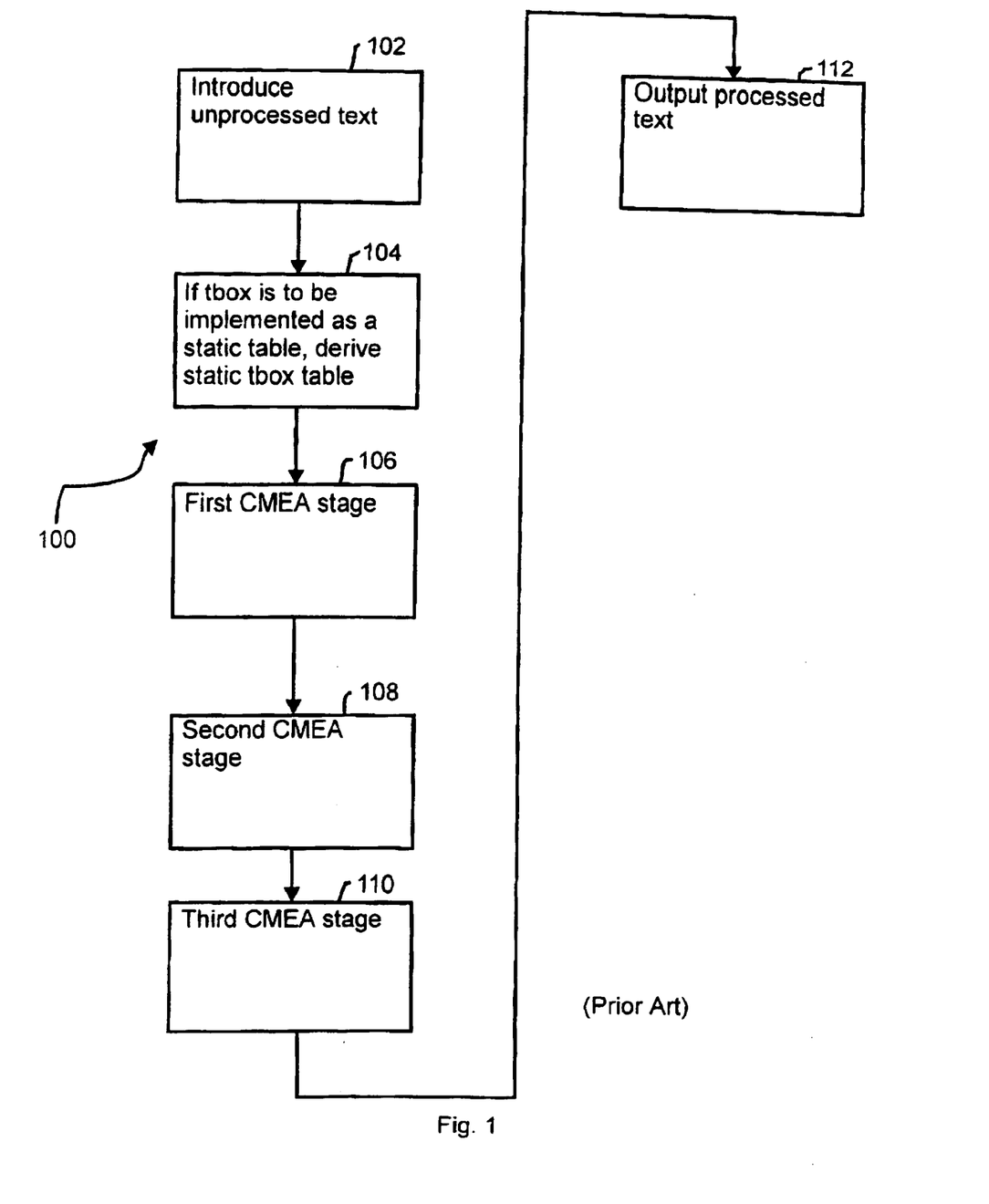
FIG. 1 is a flowchart illustrating aspects of a prior art CMEA key generation process and its utilization in a CMEA based implementation of encryption.

FIG. 1 is a flowchart illustrating a prior art method 100 using a CMEA key for encryption of certain critical user data which may be transmitted during a call. The CMEA key is used to create a secret array, tbox(z), of 256 bytes. Alternatively, the tbox function may be implemented as a function call. This reduces the use of RAM, but increases processing time by roughly an order of magnitude.

At step 102, unprocessed text is introduced. At step 104, in systems which implement tbox as a static table rather than as a function call, the static tbox table is derived. The tbox table is derived as follows:
For each z in the range $0<z<256$, tbox(z)=C(((C(((C(((C((z XOR k0)+k1)+z)XOR k2)+k3)+z)XOR k4)+k5)+z)XOR k6)+k7)+z, where "+" denotes modulo 256 addition, "XOR" is the is the bitwise boolean Exclusive-OR operator, "z" is the function argument, k0,. .,k7 comprise the eight octets of the CMEA key, and C( ) is the outcome of a Cellular Authentication, Voice Privacy and Encryption (CAVE) 8-bit table look-up. In the absence of the enhancements discussed below, the tbox function is well known in the art. However, the enhancements discussed in connection with FIGS. 2–5 below enable the tbox function to provide a significantly increased measure of security.

CMEA comprises three successive stages, each of which alters the byte string in the data buffer. At steps 106, 108 and 110, first, second and third stages of the CMEA process are respectively performed, as will be described herein. A data buffer d bytes long, with each byte designated by b(i), for i an integer in the range $0 \leq i < d$, is enciphered in three stages. The first stage (I) of CMEA is as follows:

1. Initialize a variable z to zero,

2. For successive integer values of i in the range $0 \leq i < d$ a. form a variable q by: q=z⊕ low order byte of i, where
      ⊕ is the bitwise boolean Exclusive-OR operator,     b. form variable k by: k=TBOX(q), c. update b(i) with: b(i)=b(i)+k mod 256, and d. update z with: z=b(i)+z mod 256.

The second stage (II) of CMEA is:

1. for all values of i in the range 0<i<(d−1)/2: b(i)=b(i) ⊕(b(d−1−i) OR 1), where OR is the bitwise boolean OR operator.

The final or third stage (III) of CMEA is the decryption that is inverse of the first stage:

1. Initialize a variable z to zero,

2. For successive integer values of i in the range 0≦i<d a. form a variable q by: q=z e low order byte of i b. form variable k by: k=TBOX(q), c. update z with: z=b(i)+z mod 256, and d. update b(i) with b(i)=b(i)−k mod 256.

At step 112, the final processed output is provided.

The above described CMEA process is self-inverting. That is, the same steps applied in the same order are used both to encrypt plaintext and to decrypt ciphertext. Therefore, there is no need to determine whether encryption or decryption is being carried out. Unfortunately, it has been shown that the above-described CMEA process may be subject to an attack which will allow recovery of the CMEA key used for a call.

In order to provide added security to customer information, an encryption system according to the present invention employs a CMEA iteration employing an enhanced tbox function employing an involutary lookup table. The encryption system also improves the use of the tbox function by permuting the inputs to the tbox function by secret offsets. Additional security is provided by applying transformations to a message before and after the CMEA iteration.

Figure 2:
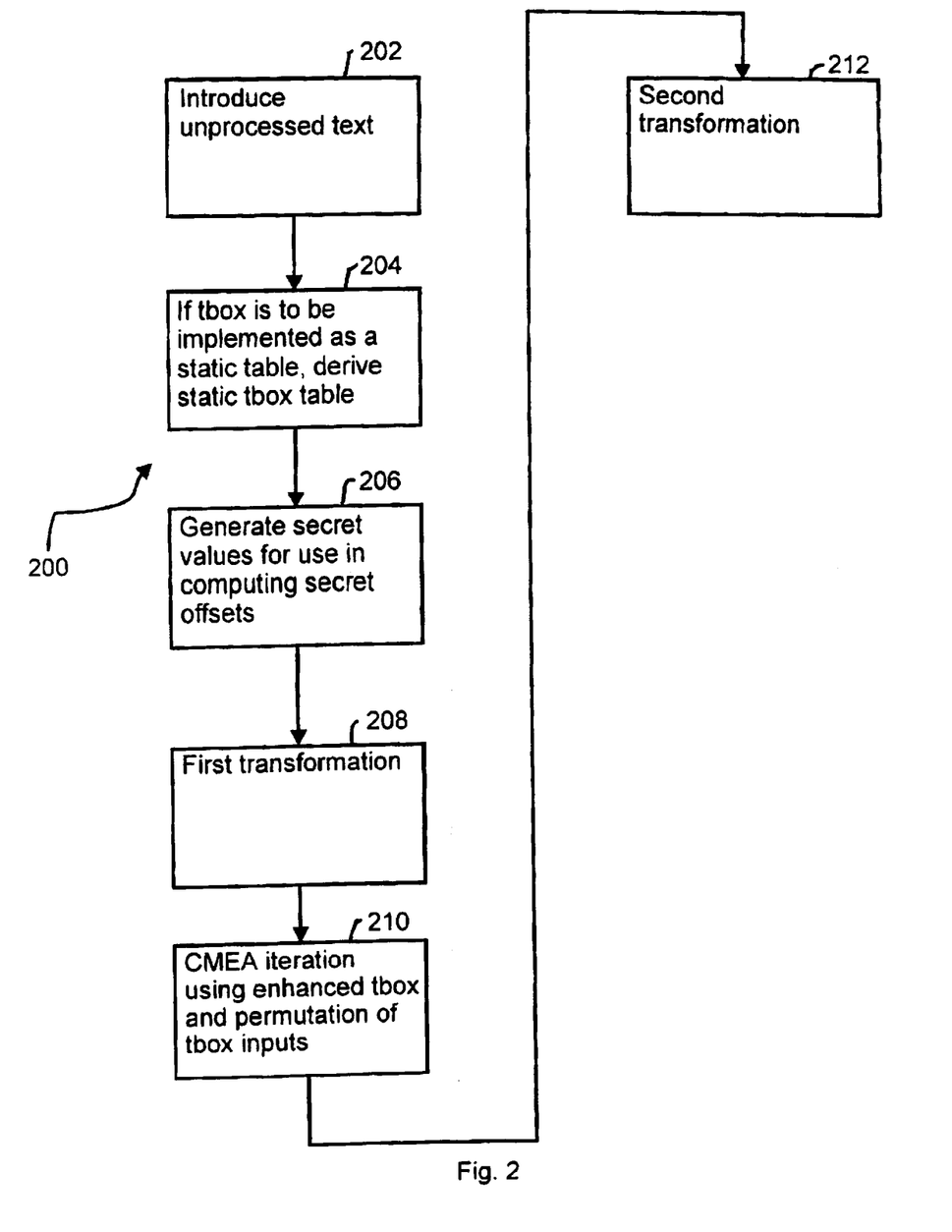
FIG. 2 is a flowchart illustrating a forward ECMEA encryption method according to the present invention, employing a first transformation, a CMEA process in which an enhanced tbox function employing involutary lookup is employed with the inputs to the enhanced tbox function being permuted by a secret offset, and a second transformation.

FIG. 2 is a flowchart showing an enhanced ECMEA encryption/decryption process 200 according to the present invention.

At step 202, an unprocessed message is introduced into the encryption/decryption process. The unprocessed message may be a plaintext message to be encrypted for transmission or a received encrypted message to be decrypted. The unprocessed message may preferably be stored in a data buffer for processing. At step 204, in systems which implement tbox as a static table rather than as a function call, the static tbox table is derived. At step 206, a set of secret 8-bit values $K_0$-$K_3$ is generated for use in generating the secret offsets and the offsets are calculated. Each of the secret values K0-K3 is preferably an 8-bit value. All the secret values $K_0$-$K_3$ are preferably generated for each wireless telephone call and are preferably constant throughout the call. First and second offsets are generated, using the following formulas:

$$\text{offset1}=((K_0+1)*CS_n \text{mod } 257)\oplus K_1 \text{ mod } 256$$

$$\text{offset2}=((K_2+1)*CS_n \text{mod } 257)\oplus K_3 \text{ mod } 256$$

where $K_0$-$K_3$ are as defined above and CS is a cryptosynchronization value. The $CS_n$ value is an external value for the nth message. The CS, value comprises 8 bits and is preferably implemented as a binary counter. Offset1 and offset2 are each 8-bit values.

At step 208, a transformation is performed on the unprocessed message, using first and second secret offsets to produce a first transformed message. Details of the transformation will be discussed below in connection with the discussion of FIG. 3.

At step 210, the first transformed message is subjected to an iteration of the CMEA process, using a CMEA key, to produce an intermediate ciphertext message. The CMEA function includes an enhanced tbox function, which performs an involutary lookup of each octet, and is given by the formula tbox(z) = I(I(I(I(I(I(I(I(I(I(I(I(z+k0)XOR k1)+k2)XOR k3)+k4)XOR k5)+k6)XOR k7)−k6)XOR k5)−k4)XOR k3)−k2)XOR k1)−k0 where  "+" denotes modulo 256 addition,
"−" denotes modulo 256 subtraction,
"XOR" is the XOR function,
"z" is the function argument,
k0, . . . , k7 are the eight octets of ECMEA key, and I( ) is the outcome of a known ibox 8-bit table look-up. The ibox table is an involutary lookup table with entries chosen to perform involutary mapping of 8-bit bytes onto 8-bit bytes. A preferred example of an ibox table is as follows:

| | | | | | | | |
|---|---|---|---|---|---|---|---|
| 0xa2, | 0xfc, | 0x5c, | 0x12, | 0x6b, | 0xae, | 0x70, | 0x7c, |
| 0x7e, | 0x41, | 0xd3, | 0x86, | 0xc1, | 0x85, | 0x89, | 0x9a, |
| 0x59, | 0xab, | 0x03, | 0x7d, | 0x62, | 0xca, | 0x4f, | 0xdc, |
| 0xa5, | 0x48, | 0xf6, | 0x71, | 0x56, | 0xc0, | 0x8c, | 0x9e, |
| 0x9f, | 0xc3, | 0x60, | 0xd9, | 0xc5, | 0x53, | 0xf9, | 0x7f, |
| 0xb1, | 0x4a, | 0x6c, | 0xa8, | 0x95, | 0xab, | 0x76, | 0xba, |
| 0x8e, | 0x83, | 0x43, | 0x90, | 0x7a, | 0x37, | 0xcf, | 0x35, |
| 0xb4, | 0xfd, | 0xf0, | 0xa3, | 0x51, | 0xe5, | 0x6e, | 0xcb, |
| 0x67, | 0x09, | 0x92, | 0x32, | 0xe7, | 0x8b, | 0xd0, | 0xed, |
| 0x19, | 0xb7, | 0x29, | 0x80, | 0xc4, | 0xff, | 0xa9, | 0x16, |
| 0xc6, | 0x3c, | 0xfb, | 0x25, | 0x98, | 0xf8, | 0x1c, | 0xde, |
| 0xaa, | 0x10, | 0xad, | 0x8a, | 0x02, | 0x64, | 0xd2, | 0xf7, |
| 0x22, | 0xd6, | 0x14, | 0xbd, | 0x5d, | 0xa0, | 0xe0, | 0x40, |
| 0xda, | 0x88, | 0xe9, | 0x04, | 0x2a, | 0xaf, | 0x3e, | 0xf3, |
| 0x06, | 0x1b, | 0xc7, | 0xe4, | 0x91, | 0xd5, | 0x2e, | 0xc8, |
| 0xdf, | 0xf4, | 0x34, | 0xa4, | 0x07, | 0x13, | 0x08, | 0x27, |
| 0x4b, | 0xbf, | 0xe1, | 0x31, | 0xce, | 0x0d, | 0x0b, | 0xf2, |
| 0x69, | 0x0e, | 0x5b, | 0x45, | 0x1e, | 0xb6, | 0x30, | 0xec, |
| 0x33, | 0x74, | 0x42, | 0xa7, | 0xb8, | 0x2c, | 0xee, | 0xbc, |
| 0x54, | 0xd7, | 0x0f, | 0xd8, | 0xb3, | 0xfe, | 0x1f, | 0x20, |
| 0x65, | 0xcc, | 0x00, | 0x3b, | 0x7b, | 0x18, | 0xfa, | 0x93, |
| 0x2b, | 0x4e, | 0x58, | 0x2d, | 0xe8, | 0x5a, | 0x05, | 0x6d, |
| 0xdd, | 0x28, | 0xef, | 0x9c, | 0x38, | 0xdb, | 0x8d, | 0x49, |
| 0x94, | 0xe2, | 0x2f, | 0xcd, | 0x97, | 0x63, | 0xea, | 0x81, |
| 0x1d, | 0x0c, | 0xe6, | 0x21, | 0x4c, | 0x24, | 0x50, | 0x72, |
| 0x77, | 0xf5, | 0x15, | 0x3f, | 0xa1, | 0xbb, | 0x84, | 0x36, |
| 0x46, | 0xf1, | 0x5e, | 0x0a, | 0xe3, | 0x75, | 0x61, | 0x99, |
| 0x9b, | 0x23, | 0x68, | 0xb5, | 0x17, | 0xb0, | 0x57, | 0x78, |
| 0x66, | 0x82, | 0xb9, | 0xd4, | 0x73, | 0x3d, | 0xc2, | 0x44, |
| 0xac, | 0x6a, | 0xbe, | 0x11, | 0x8f, | 0x47, | 0x96, | 0xb2, |
| 0x3a, | 0xd1, | 0x87, | 0x6f, | 0x79, | 0xc9, | 0x1a, | 0x5f, |
| 0x55, | 0x26, | 0xa6, | 0x52, | 0x01, | 0x39, | 0x9d, | 0x4d | where the entries are in hexadecimal format. The ibox table entries are indexed from 0x00 to 0xff. This translates into decimal 0 to 255. For the above table, the first entry in the first row is indexed 0x00, the eighth entry in the first row is indexed 0x07, the fit entry in the second row is indexed 0x08, the eighth entry in the second row is indexed 0x0f, and so on. It is apparent from an examination of the table that it provides an involutary lookup. That is, ibox(ibox((z))=z. For example, ibox(0x00)=0xa2. Looking up the entry indexed 0xa2, it is seen that ibox(0xa2)=0x00. The enhanced tbox function is substituted for the TBOX function described above in connection with the discussion of FIG. 1.

In order to further enhance security, the inputs to the tbox function are subjected to a permutation employing either the first or the second secret offset. Each tbox function input is subjected to a permutation to produce a permutation result.

If a tbox function input is defined as x, for example, the permutation result is the value of (x⊕offset1). The permutation result is subjected to the tbox function. Thus, for each tbox input x, the function used is tbox(x⊕offset1). The permutation of the tbox inputs effectively causes the location of the tbox entries to shift with each message, greatly increasing the difficulty of an attack. At step 212, the intermediate ciphertext is subjected to a second transformation to produce a final processed text. The second transformation is identical to the first transformation, except that the first and second offsets are reversed for the second transformation. That is, where the first offset is used in the first transformation, the second offset is used in the second transformation, and where the second offset is used in the first transformation, the first offset is used in the second transformation. The second transformation is described below in connection with the discussion of FIG. 4.

Figure 3:
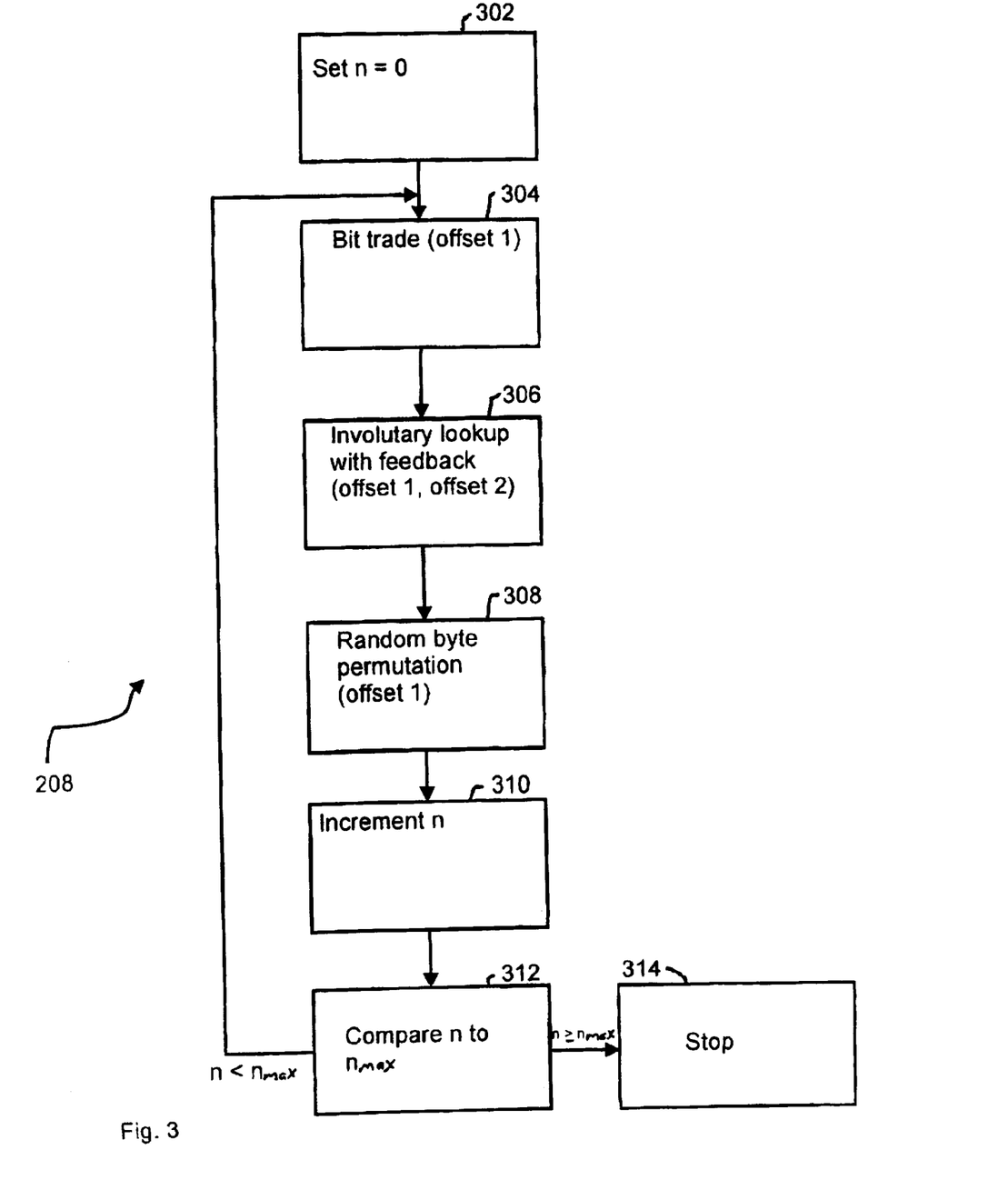
FIG. 3 is a flowchart illustrating the first transformation employed in the forward ECMEA encryption method.

FIG. 3 is a flowchart illustrating in detail the steps of the first transformation 208 performed in the forward ECMEA process 200 illustrated in FIG. 2. Steps 304–308 are performed for each octet n of the unprocessed message, for n=0 to n=$n_{max}$−1, where $n_{max}$ is the number of octets in the message. At step 302, n is set to 0. At step 304, bit trading is performed between the octet n and the octet above it using the following formula:

$$\text{If } n < n_{max} - 1,$$
$$j = O_n \oplus O_{n+1}$$
$$j = j \text{ AND tbox } (j \oplus \text{offset1})$$
$$O_n = O_n \oplus j$$
$$O_{n+1} = O_{n+1} \oplus j$$

where
j is a temporary variable and On is the nth octet of the unprocessed message, and AND is the bitwise Boolean AND operator.

At step 306, an involutary lookup with feedback is performed, according to the following formula:

$$\text{If } n < n_{max} - 1,$$
$$O_n = \text{offset1} \oplus O_{n+1} \oplus \text{tbox}(O_n \oplus \text{offset2})$$
$$\text{If } n = n_{max} - 1,$$
$$O_n = \text{offset1} \oplus \text{tbox}(O_n \oplus \text{offset2})$$

At step 308, a random byte permutation is performed. That is, an octet may be exchanged with a random one below it according to the following formula:

$$\text{If } n > 0:$$
$$\text{If } n < n_{max} - 1,$$
$$j = \text{tbox}(O_{n+1} \oplus \text{offset1})$$
$$\text{If } n = n_{max} - 1,$$
$$j = \text{tbox}(0x37 \oplus \text{offset1})$$
$$j = ((n + 1) * j) >> 8;$$
$$z = O_j$$
$$O_j = O_n$$
$$O_n = z,$$

where j and z are buffer variables, * indicates multiplication, and >>8 indicates a right shift of 8 bits.

At step 310 n is incremented. At step 312, n is compared to $n_{max}$. If n<$n_{max}$, control is returned to step 304. If n≧$n_{max}$, control passes to step 314 and the first transformation step is complete.

Figure 4:
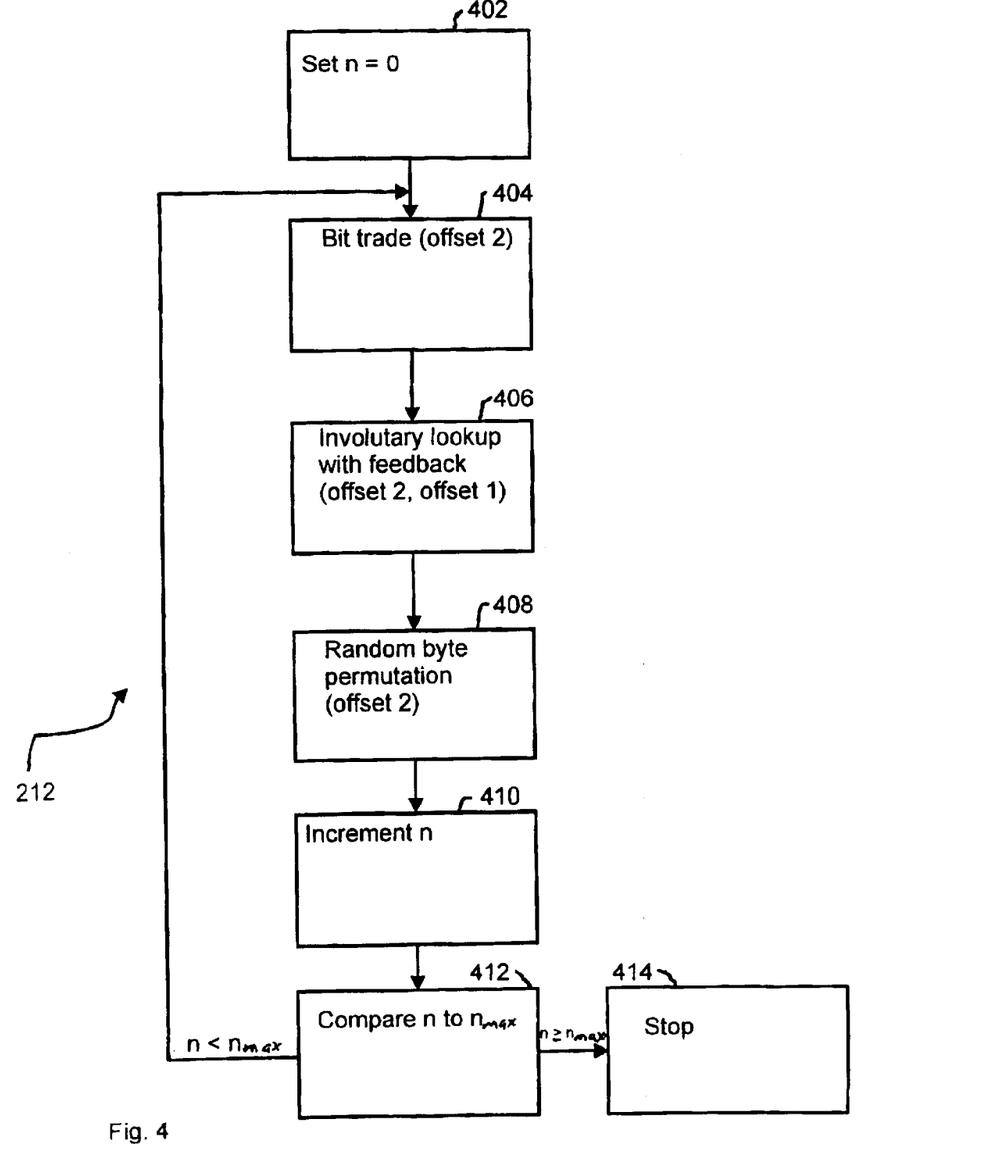
FIG. 4 is a flowchart illustrating the second transformation employed in the forward ECMEA encryption method.

FIG. 4 is a flowchart illustrating in detail the steps of the second transformation 212 performed in the forward ECMEA process 200 illustrated in FIG. 2. Steps 404–408 are performed for each octet n of the intermediate ciphertext message, for n=0 to n=$n_{max}$−1, where $n_{max}$ is the number of octets in the message. At step 402, n is set to 0. At step 404, bit trading is performed between the octet n and the octet above it using the following formula:

$$\text{If } n < n_{max} - 1,$$
$$j = O_n \oplus O_{n+1}$$
$$j = j \text{ AND tbox}(j \oplus \text{offset2})$$
$$O_n = O_n \oplus j$$
$$O_{n+1} = O_{n+1} \oplus j$$

where
j is a temporary variable and $O_n$ is the nth octet of the intermediate ciphertext message.

At step 406, an involuntary lookup with feedback is performed, according to the following formula:

$$\text{If } n < n_{max} - 1,$$
$$O_n = \text{offset2} \oplus O_{n+1} \oplus \text{tbox}(O_n \oplus \text{offset1}).$$
$$\text{If } n = n_{max} - 1,$$
$$O_n = \text{offset2} \oplus \text{tbox}(O_n \oplus \text{offset1}).$$

At step 408, a random byte permutation is performed. That is, an octet may be exchanged with a random one below it according to the following formula:

$$\text{If } n > 0:$$
$$\text{If } n < n_{max} - 1,$$
$$j = \text{tbox}(O_{n+1} \oplus \text{offset2})$$
$$\text{If } n = n_{max} - 1,$$
$$j = \text{tbox}(0x37 \oplus \text{offset2})$$
$$j = ((n + 1) * j) >> 8$$
$$z = O_j$$
$$O_j = O_n$$
$$O_n = z,$$

where j and z are temporary buffer variables, * indicates multiplication, and >>8 indicates a right-shift of 8 bits.

At step 410, n is incremented. At step 412, n is compared to $n_{max}$. If n<$n_{max}$, control is returned to step 404. If n≦$n_{max}$, control passes to step 414 and the second transformation step is complete.

Figure 5:
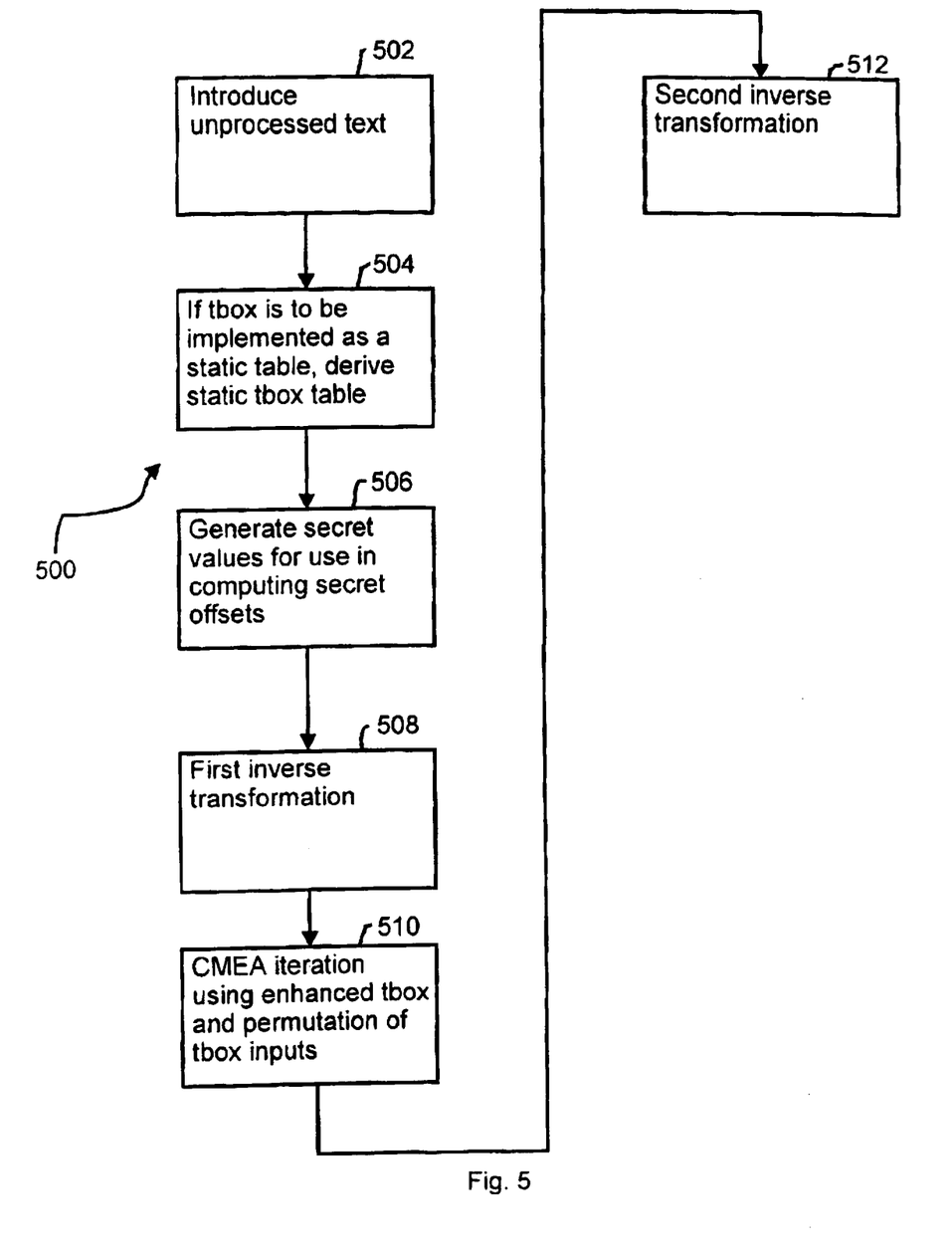
FIG. 5 is a flowchart illustrating a reverse ECMEA encryption method according to the present invention, employing a first inverse transformation, a CMEA process in which an enhanced tbox function employing involutary lookup is employed with the inputs to the enhanced tbox function being permuted by a secret offset, and a second inverse transformation.

FIG. 5 is a flowchart illustrating a reverse ECMEA process 500, suitable for decrypting text encrypted by the forward ECMEA process 200 illustrated in FIG. 2, or for encrypting text for decryption by the forward ECMEA process 200 illustrated in FIG. 2. The reverse ECMEA process 500 is identical to the forward ECMEA process 200, except that in the forward and reverse transformations, the first offset is replaced by the second offset, and the second offset is replaced by the first offset.

At step 502, an unprocessed message is introduced into the encryption/decryption process. At step 504, in systems which implement tbox as a static table rather than as a function call, the static tbox table is derived. At step 506, a set of secret 8-bit values $K_0$-$K_3$ is generated for use in generating the secret offsets and the offsets are calculated. The set of secret values may be generated using any of a number of techniques commonly known in the art. All the secret values $K_0$-$K_3$ are preferably generated for each wireless telephone call and are preferably constant throughout the call. First and second offsets are generated, using the following formulas:

$$\text{offset1}=((K_0+1)*CS \bmod 257) \oplus K_1 \bmod 256$$

$$\text{offset2}=((K_2+1)*CS \bmod 257) \oplus K_3 \bmod 256$$

where $K_0$-$K_3$ are as defined above, and CS is a cryptosynchronization value. The $CS_n$ value is an external value for the nth message. The $CS_n$ value comprises 8 bits and is preferably implemented as a binary counter. Offset1 and offset2 are each 8-bit values.

At step 508, a first inverse transformation is performed on the unprocessed message, using first and second secret offsets, to produce a first inverse transformed message. Details of the transformation are as similar to those discussed above in connection with the discussion of FIG. 3, except that the steps performed in the inverse transformation are in reverse order with respect to those of the transformation, and the message octets are processed in reverse order. Details of the first inverse transformation are discussed below in connection with the discussion of FIG. 6 and details of the second inverse transformation are discussed below in connection with the discussion of FIG. 7.

At step 510, the first inverse transformed message is subjected to an iteration of the CMEA process, using a CMEA key, to produce a reverse intermediate ciphertext message. The CMEA function includes an enhanced tbox function, which performs an involutary lookup of each octet, and is given by the formula

--- tbox(z) = I(I(I(I(I(I(I(I(I(I(I(I(z+k0)XOR k1)+k2)XOR k3)+ k4)XOR k5)+k6)XOR k7)−k6)XOR k5)−k4)XOR k3)−k2)XOR k1)−k0
    where    "+" denotes modulo 256 addition,
                   "−" denotes modulo 256 subtraction,
                   "XOR" is the XOR function,
                   "z" is the function argument,
                   k0, . . . , k7 are the eight octets of ECMEA key,

--- and I( ) is the outcome of a known ibox 8-bit table look-up. The ibox table is an involutary lookup table with entries chosen to perform involutary mapping of 8-bit bytes onto 8-bit bytes. The ibox table is an involutary lookup table with entries chosen to perform involutary mapping of 8-bit bytes onto 8-bit bytes. A preferred example of an ibox table is as follows:

| | | | | | | | |
|---|---|---|---|---|---|---|---|
| 0xa2, | 0xfc, | 0x5c, | 0x12, | 0x6b, | 0xae, | 0x70, | 0x7c, |
| 0x7e, | 0x41, | 0xd3, | 0x86, | 0xc1, | 0x85, | 0x89, | 0x9a, |
| 0x59, | 0xab, | 0x03, | 0x7d, | 0x62, | 0xca, | 0x4f, | 0xdc, |
| 0xa5, | 0x48, | 0xf6, | 0x71, | 0x56, | 0xc0, | 0x8c, | 0x9e, |
| 0x9f, | 0xc3, | 0x60, | 0xd9, | 0xc5, | 0x53, | 0xf9, | 0x7f, |
| 0xb1, | 0x4a, | 0x6c, | 0xa8, | 0x95, | 0xab, | 0x76, | 0xba, |
| 0x8e, | 0x83, | 0x43, | 0x90, | 0x7a, | 0x37, | 0xcf, | 0x35, |
| 0xb4, | 0xfd, | 0xf0, | 0xa3, | 0x51, | 0xe5, | 0x6e, | 0xcb, |
| 0x67, | 0x09, | 0x92, | 0x32, | 0xe7, | 0x8b, | 0xd0, | 0xed, |
| 0x19, | 0xb7, | 0x29, | 0x80, | 0xc4, | 0xff, | 0xa9, | 0x16, |
| 0xc6, | 0x3c, | 0xfb, | 0x25, | 0x98, | 0xf8, | 0x1c, | 0xde, |
| 0xaa, | 0x10, | 0xad, | 0x8a, | 0x02, | 0x64, | 0xd2, | 0xf7, |
| 0x22, | 0xd6, | 0x14, | 0xbd, | 0x5b, | 0xa0, | 0xe0, | 0x40, |
| 0xda, | 0x88, | 0xe9, | 0x04, | 0x2a, | 0xaf, | 0x3e, | 0xf3, |
| 0x06, | 0x1b, | 0xc7, | 0xe4, | 0x91, | 0xd5, | 0x2e, | 0xc8, |
| 0xdf, | 0xf4, | 0x34, | 0xa4, | 0x07, | 0x13, | 0x08, | 0x27, |
| 0x4b, | 0xbf, | 0xe1, | 0x31, | 0xce, | 0x0d, | 0x0b, | 0xf2, |
| 0x69, | 0x0e, | 0x5b, | 0x45, | 0x1e, | 0xb6, | 0x30, | 0xec, |
| 0x33, | 0x74, | 0x42, | 0xa7, | 0xb8, | 0x2c, | 0xee, | 0xbc, |
| 0x54, | 0xd7, | 0x0f, | 0xd8, | 0xb3, | 0xfe, | 0x1f, | 0x20, |
| 0x65, | 0xcc, | 0x00, | 0x3b, | 0x7b, | 0x18, | 0xfa, | 0x93, |
| 0x2b, | 0x4e, | 0x58, | 0x2d, | 0xe8, | 0x5a, | 0x05, | 0x6d, |
| 0xdd, | 0x28, | 0xef, | 0x9c, | 0x38, | 0xdb, | 0x8d, | 0x49, |
| 0x94, | 0xe2, | 0x2f, | 0xcd, | 0x97, | 0x63, | 0xea, | 0x81, |
| 0x1d, | 0x0c, | 0xe6, | 0x21, | 0x4c, | 0x24, | 0x50, | 0x72, |
| 0x77, | 0xf5, | 0x15, | 0x3f, | 0xa1, | 0xbb, | 0x84, | 0x36, |
| 0x46, | 0xf1, | 0x5e, | 0x0a, | 0xe3, | 0xa75, | 0x61, | 0x99, |
| 0x9b, | 0x23, | 0x68, | 0xb5, | 0x17, | 0xb0, | 0x57, | 0x78, |
| 0x66, | 0x82, | 0xb9, | 0xd4, | 0x73, | 0x3d, | 0xc2, | 0x44, |
| 0xac, | 0x6a, | 0xbe, | 0x11, | 0x8f, | 0x47, | 0x96, | 0xb2, |
| 0x3a, | 0xd1, | 0x87, | 0x6f, | 0x79, | 0xc9, | 0x1a, | 0x5f, |
| 0x55, | 0x26, | 0xa6, | 0x52, | 0x01, | 0x39, | 0x9d, | 0x4d, | where the entries are in hexadecimal format. The ibox table entries are indexed from 0x00 to 0xff. This translates into decimal 0 to 255. For the above table, the first entry in the first row is indexed 0x00, the eighth entry in the first row is indexed 0x07, the first entry in the second row is indexed 0x08, the eighth entry in the second row is indexed 0x0f, and so on. It is apparent from an examination of the table that it provides an involutary lookup. That is, ibox(ibox((z))=z. For example, ibox(0x00)=0xa2. Looking up the entry indexed 0xa2, it is seen that ibox(0xa2)=0x00. The enhanced tbox function is substituted for the TBOX function described above in connection with the discussion of FIG. 1.

In order to further enhance security, the inputs to the tbox function are subjected to a permutation employing the first secret offset. Each tbox function input is subjected to a permutation to produce a permutation result. If a tbox function input is defined as x, for example, the permutation result is the value of(x$\oplus$ offset1). The permutation result is subjected to the tbox function. Thus, for each tbox input x, the function used is tbox(x$\oplus$ offset1). The permutation of the tbox inputs effectively causes the location of the tbox entries to shift with each message, greatly increasing the difficulty of an attack. At step 512, the reverse intermediate ciphertext is subjected to a second inverse transformation to produce a final processed text. The second inverse transformation is identical to the first inverse transformation, except that the first and second offsets are exchanged for the second inverse transformation with respect to the first inverse transformation. That is, where the first offset is used for the first inverse transformation, the second offset is used for the second inverse transformation, and where the second offset is used for the first inverse transformation, the first offset is used for the second inverse transformation.

Figure 6:
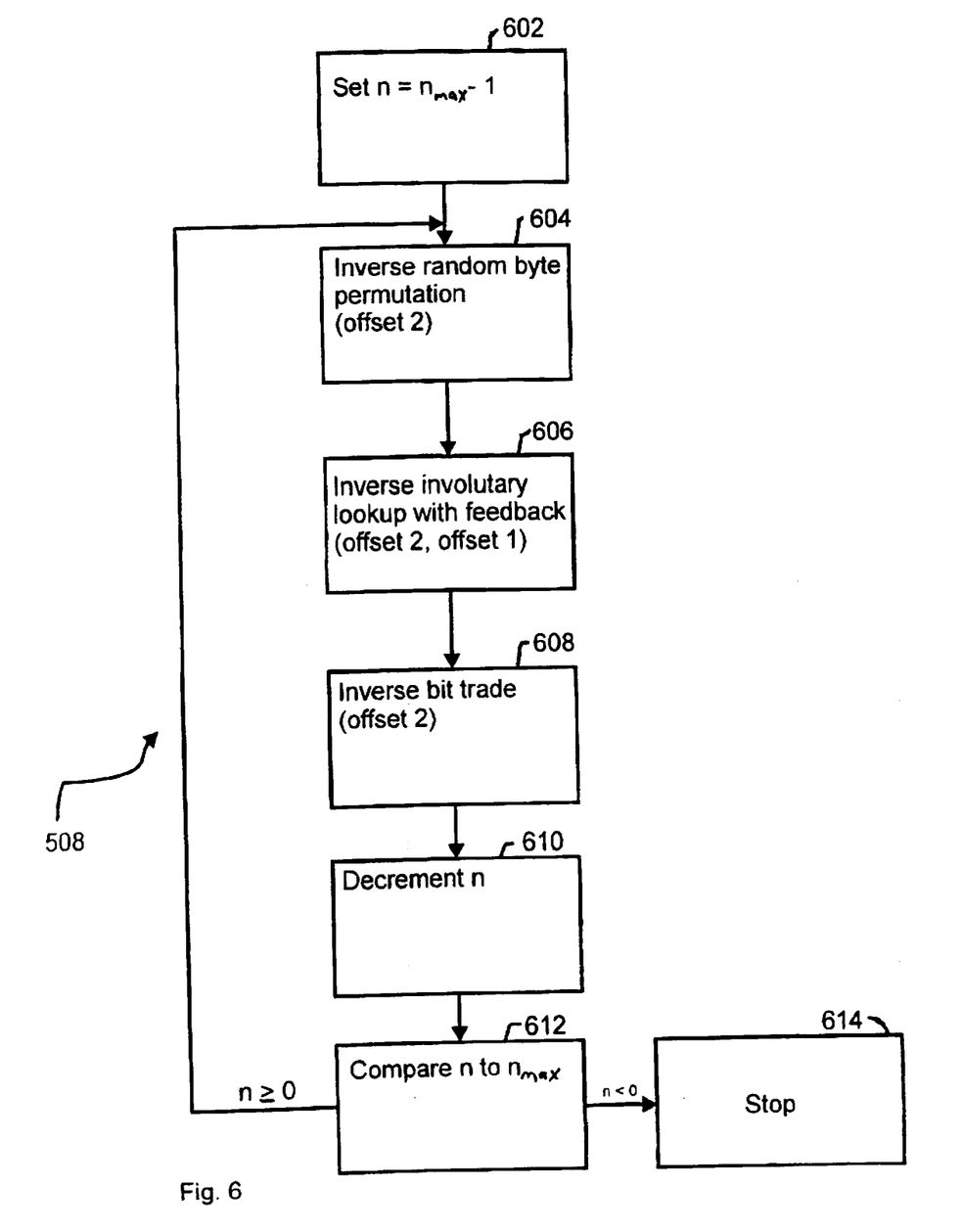
FIG. 6 is a flowchart illustrating the first inverse transformation employed in the reverse ECMEA encryption method.

FIG. 6 is a flowchart illustrating in detail the steps of the first inverse transformation 508 performed in the reverse ECMEA process 500 illustrated in FIG. 5. Steps 604–608 are performed for each octet n of the unprocessed message, for n=$n_{max}$−1 to n=0, where $n_{max}$ is the number of octets in the message.

At step 602, n is set to $n_{max}$−1. At step 604, an inverse random byte permutation is performed. That is, an octet may be exchanged with a random one below it according to the following formula:

---

If n > 0,
    If n < $n_{max}$ − 1,
        j = tbox($O_{n+1}$ $\oplus$ offset2)
    If n = $n_{max}$ − 1, -continued $$j = \text{tbox}(0x37 \oplus \text{offset2})$$
$$j = ((n + 1) * j) >> 8$$
$$z = O_j$$
$$O_j = O_n$$
$$O_n = z,$$

where $O_n$ is the nth octet of the unprocessed message, j and z are temporary variables, * indicates multiplication, and >>8 indicates a right shift of 8 bits.

At step 604, an inverse involutary lookup with feedback is performed, according to the following formula:

$$\text{If } n < n_{max} - 1,$$
$$O_n = \text{offset1} \oplus \text{tbox}(O_n \oplus O_{n+1} \oplus \text{offset2})$$
$$\text{If } n = n_{max} - 1,$$
$$O_n = \text{offset1} \oplus \text{tbox}(O_n \oplus \text{offset2})$$

At step 606, inverse bit trading is performed between the octet n and the octet above it using the following formula:

$$\text{If } n < n_{max} - 1:$$
$$j = O_n \oplus O_{n+1}$$
$$j = j \text{ AND tbox}(j \oplus \text{offset2})$$
$$O_n = O_n \oplus j$$
$$O_{n+1} = O_{n+1} \oplus j$$

where
j is a temporary variable.

At step 610, n is decremented. At step 612, n is compared to 0. If n≥0, control is returned to step 604. If n<0, control passes to step 614 and the first inverse transformation step is complete.

Figure 7:
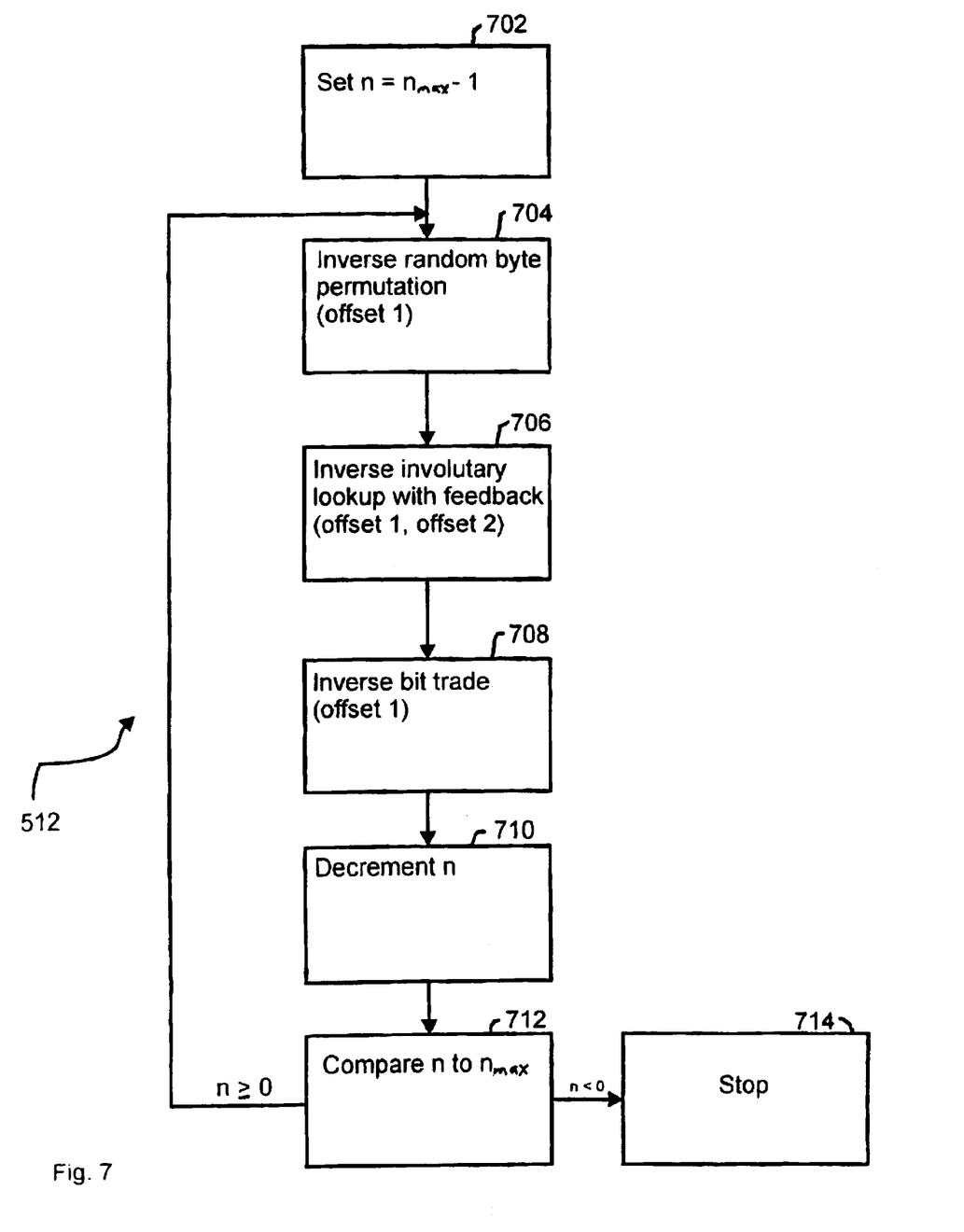
FIG. 7 is a flowchart illustrating the second inverse transformation employed in the reverse ECMEA encryption method.

FIG. 7 is a flowchart illustrating in detail the steps of the second inverse transformation 512 performed in the reverse ECMEA process 500 illustrated in FIG. 5. Steps 704–708 are performed for each octet n of the intermediate ciphertext message, for n=$n_{max}$−1 to n=0, where $n_{max}$ is the number of octets in the message.

At step 702, n is set to $n_{max}$−1. At step 704, an inverse random byte permutation is performed. That is, an octet may be exchanged with a random one below it according to the following formula:

$$\text{If } n > 0,$$
$$\quad \text{If } n < n_{max} - 1,$$
$$\quad\quad j = \text{tbox}(O_{n+1} \oplus \text{offset1})$$
$$\quad \text{If } n = n_{max} - 1,$$
$$\quad\quad j = \text{tbox}(0x37 \oplus \text{offset1})$$
$$\quad j = ((n + 1) * j) >> 8;$$
$$\quad z = O_j$$
$$\quad O_j = O_n$$
$$\quad O_n = z,$$

where $O_n$ is the nth octet of the intermediate ciphertext message, j and z are temporary variables, * indicates multiplication, and >>8 indicates a right shift of 8 bits.

At step 706, an inverse involutary lookup with feedback is performed, according to the following formula:

$$\text{If } n < n_{max} - 1,$$
$$O_n = \text{offset2} \oplus \text{tbox}(O_n \oplus O_{n+1} \oplus \text{offset1})$$
$$\text{If } n = n_{max} - 1,$$
$$O_n = \text{offset2} \oplus \text{tbox}(O_n \oplus \text{offset1})$$

At step 708, inverse bit trading is performed between the octet n and the octet above it using the following formula:

$$\text{If } n < n_{max} - 1:$$
$$j = O_n \oplus O_{n+1}$$
$$j = j \text{ AND tbox}(j \oplus \text{offset1})$$
$$O_n = O_n \oplus j$$
$$O_{n+1} = O_{n+1} \oplus j$$

where
j is a temporary variable.

At step 710, n is decremented. At step 712, n is compared to 0. If n≥0, control is returned to step 704. If n<0, control passes to step 714 and the second inverse transformation step is complete.

Figure 8:
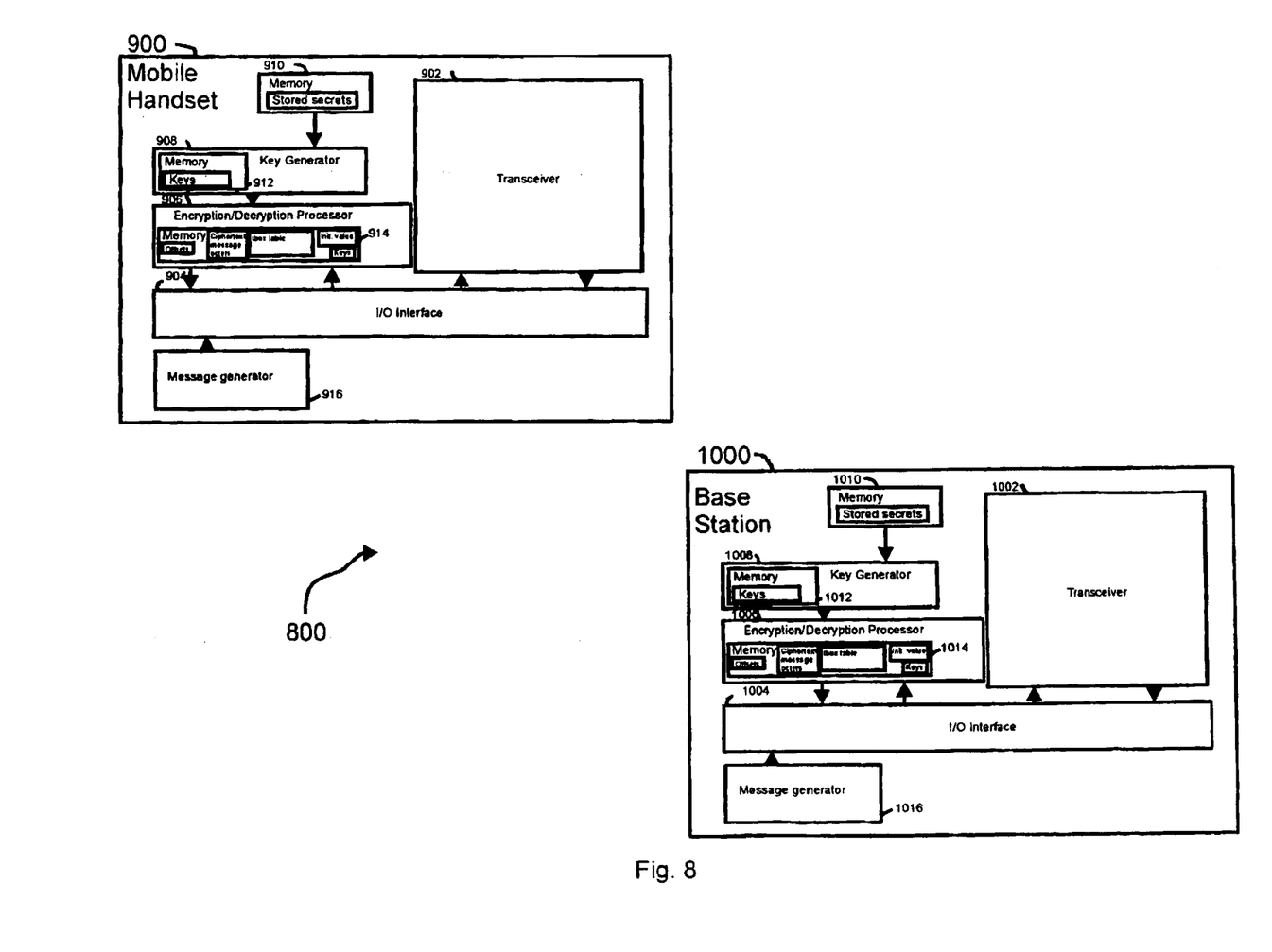
FIG. 8 is a diagram illustrating a telephone system employing ECMEA processing according to the present invention.

FIG. 8 is a diagram showing a wireless telephone system 800 including a handset 900 and a base station 1000. Both the handset 900 and the base station 1000 are equipped to perform message transmission and processing according to the present invention. The telephone handset 900 includes a transceiver 902, an input/output (I/O) interface 904, an encryption/decryption processor 906, and a key generator 908. The key generator 908 receives and employs stored secret data for key generation. Stored secret data is preferably stored in nonvolatile memory 910 such as an EEPROM or a Flash memory. The key generator also generates secret values $K_0$-$K_3$ used to produce secret offsets. The key generator may be designed to generate secret values $K_0$-$K_3$ using any of a number of techniques commonly known in the art. A set of secret values $K_0$-$K_3$ is preferably generated for each wireless telephone call, and the values $K_0$-$K_3$ are preferably held constant throughout the call. The key generator 908 stores the generated keys and secret values $K_0$-$K_3$ in memory 912. The encryption/decryption processor also includes memory 914 for storage of keys received from the key generator 908, an initialization value used in production of secret offsets, ciphertext message octets, and a static tbox table which may be generated and used if it is desired to implement the tbox function as a static table. The telephone handset 900 also includes a message generator 916, which generates messages to be encrypted by the encryption/decryption processor 906 and transmitted by the transceiver 902.

When an internally generated message is to be encrypted and transmitted by the telephone handset 900, the message is transmitted from message generator 916 to the I/O interface 904. The I/O interface 904 transmits the message, along with the identification, to the encryption/decryption processor 906. The encryption/decryption processor 906 receives a key from the key generator 908, which it then uses to encrypt the message.

When the encryption/decryption processor 906 receives a plaintext message from the message generator 916, the message is subjected to a forward ECMEA process as described above in connection with the discussion of FIG. 2. The forward ECMEA process includes a first transformation, an iteration of the CMEA process, and a second transformation. The use of the ECMEA process as described above in FIG. 2 causes the location of the tbox entries to shift not merely with each message, but also for each iteration of the encryption of a single message.

Upon completion of forward ECMEA process, a final ciphertext is produced and stored in memory 914, and also routed to the I/O interface 904 and to the transceiver 902 for transmission.

When an encrypted message is received by the telephone handset 900 for the purpose of decryption, the transceiver 902 passes it to the I/O interface 904. The I/O interface passes the message to the encryption/decryption processor 906. The encryption/decryption processor 906 receives a key from the key generator 908 and decrypts the message using the forward ECMEA process described above in connection with the discussion of FIG. 2. The telephone handset 900 employs the forward ECMEA process for encrypting and decrypting messages, and is preferably adapted to communicate with the base station 1000 which employs the reverse ECMEA process, as described in connection with the discussion of FIG. 5, for encryption and decryption. The base station 1000 includes a transceiver 1002, I/O interface 1004, encryption/decryption processor 1006, key generator 1008, nonvolatile memory 1010, memory 1012, memory 1014, and message generator 1014. These components are similar to corresponding components of the handset 900, but are configured to implement the reverse ECMEA process. Thus, a message encrypted by the handset 900 is decrypted by the base station 1000, and a message encrypted by the base station 1000 is decrypted by the handset 900.

Depending on speed requirements and memory constraints, the handset 900 or the base station 1000 may be designed to implement the tbox as a function or as a static table. Implementation of tbox as a static table requires increased memory but provides greater speed.

The above-described enhancements to the CMEA process, while substantially increasing security, do not substantially increase processing or system resources, and are therefore well suited to use in an environment such as a wireless telephone system. Mobile units and base stations in such systems often have limited processing power.

While the present invention is disclosed in the context of a presently preferred embodiment, it will be recognized that a wide variety of implementations may be employed by persons of ordinary skill in the art consistent with the above discussion and the claims which follow below.

We claim:

1. A method of forward enhanced CMEA encryption or decryption cryptoprocessing for each message in a call, for use in a CMEA encryption system employed in a wireless telephone system comprising the steps of:

introducing an unprocessed message or encrypted message;

creating one or more secret offsets;

performing a first transformation on the unprocessed message to produce a first transformed message;

performing an iteration of the CMEA process on the first transformed message to produce an intermediate ciphertext message, the iteration of the CMEA process employing an enhanced tbox function using an involutary lookup, the inputs to the enhanced tbox function being subjected to a permutation using one or more of the secret offsets to produce a permutation result; and performing a second transformation on the intermediate ciphertext message to produce a final processed message.

2. The method of claim 1 wherein the one or more secret offsets include a first and a second secret offset.

3. The method of claim 2 wherein the step of generating each of the first and second offsets includes combining ones of a plurality of secret values with a an external value.

4. The method of claim 3 wherein the secret values include two 8-bit values for each offset.

5. The method of claim 4 wherein the external value is an 8-bit value.

6. The method of claim 5 wherein the first offset for an nth message of a call is expressed by the equation $\text{offset1} = ((K_0+1)*CS_n \bmod 257) \oplus K_1 \bmod 256$, where $K_0$ and $K_1$ are ones of the secret values and $CS_n$ is an external value for the nth message, and wherein the second offset for an nth message of a call is expressed by the equation $\text{offset2} = ((K_2+1)*CS_n \bmod 257) \oplus (K_3 \bmod 256$, where $K_2$ and $K_3$ are ones of the secret values and $CS_n$ is an external value for the nth message.

7. The method of claim 6 wherein the first transformation includes performing the steps of bit trading, involutary lookup with feedback, and random byte permutation on each octet of the unprocessed message, wherein the steps of bit trading and random byte permutation each employ the first secret offset, and wherein the step of involutary lookup with feedback employs both the first and second secret offsets.

8. The method of claim 7 wherein the second transformation includes the steps of bit trading, involutary lookup with feedback, and random byte permutation on each octet of the intermediate ciphertext message, wherein the steps of bit trading and random byte permutation each employ the second secret offset, and wherein the step of involutary lookup with feedback employs both the first and second secret offsets.

9. A method of reverse enhanced CMEA cryptoprocessing for each message in a call, for use in a CMEA encryption system employed in a wireless telephone system, comprising the steps of:

introducing an unprocessed message or encrypted message;

creating one or more secret offsets;

performing a first inverse transformation on the unprocessed message to produce a first inverse transformed message;

performing an iteration of the CMEA process on the fist inverse transformed message to produce an intermediate ciphertext message, the iteration of the CMEA process employing an enhanced tbox function using an involutary lookup, the inputs to the enhanced tbox function being subjected to a permutation using one or more of the secret offsets to produce a permutation result; and performing a second inverse transformation on the intermediate ciphertext message to produce a final processed message.

10. The method of claim 9 wherein the one or more secret offsets include a first and a second secret offset.

11. The method of claim 2 wherein the step of generating each of the first and second offsets includes combining ones of a plurality of secret values with an external value.

12. The method of claim 11 wherein the secret values include two 8-bit values for each offset.

13. The method of claim 12 wherein the external value is an 8-bit value.

14. The method of claim 5 wherein the first offset for an nth message of a call is expressed by the equation $\text{offset1} = ((K_0+1)*CS_n \bmod 257) \oplus K_1 \bmod 256$, where $K_0$ and $K_1$ are ones of the secret values and $CS_n$ is an 8-bit external value for the nth message, and wherein the second offset for an nth message of a call is expressed by the equation offset2 $((K_2+1)*CS \bmod 257) \oplus K_3 \bmod 256$, where $K_2$ and $K_3$ are ones of the secret values and $CS_n$ is an 8-bt external value for the nth message.

15. The method of claim 14 wherein the first inverse transformation includes the steps of performing random byte permutation, involutary lookup with feedback, and bit trading on each octet of the unprocessed message, wherein the steps of bit trading and random byte permutation each employ the second secret offset, and wherein the step of involutary lookup with feedback employs both the first and second secret offsets.

16. The method of claim 15 wherein the second inverse transformation includes the steps of performing random byte permutation, involutary lookup with feedback, and bit trading on each octet of the intermediate ciphertext message, wherein the steps of bit trading and random byte permutation each employ the first secret offset, and wherein the step of involutary lookup with feedback employs both the first and second secret offsets.

17. A wireless handset for securely transmitting messages, comprising:

a transceiver;

an input/output interface;

a key generator for generating one or more keys to be used during a call; and a cryptoprocessor for receiving from the input/output interface a message to be encrypted or decrypted together with identification of the message as plaintext to be encrypted or ciphertext to be decrypted and processing the message as using a forward enhanced CMEA process including first and second transformations and a CMEA iteration including an ehanced tbox function with inputs permuted by one or more secret offsets, the enhanced tbox function employing an involutary lookup table, the encryption/decryption processor being further operative to return the encrypted or decrypted message to the input/output interface for further routing.

18. A wireless base station for securely transmitting messages, comprising:

a transceiver;

an input/output interface;

a key generator for generating one or more keys to be used during a call; and a cryptoprocessor for receiving from the input/output interface a message to be encrypted or decrypted together with identification of the message as plaintext to be encrypted or ciphertext to be decrypted and processing the message as using a reverse enhanced CMEA process including first and second inverse transformations and a CMEA iteration including an ehanced tbox function with inputs permuted by one or more secret offsets, the enhanced tbox function employing an involutary lookup table, the encryption/decryption processor being further operative to return the encrypted or decrypted message to the input/output interface for further routing.

* * * * *